United States Patent Office 3,291,223
Patented Dec. 13, 1966

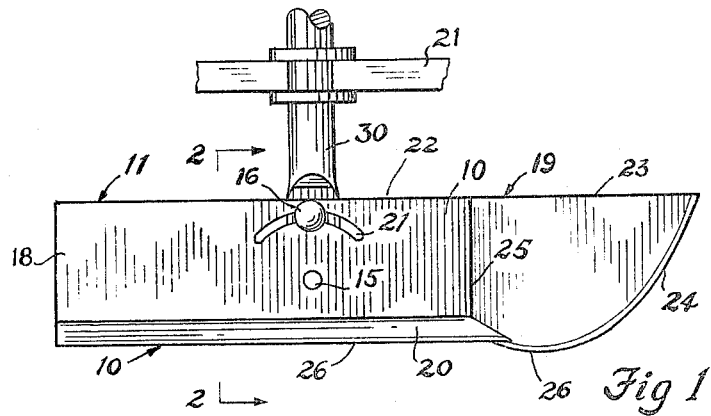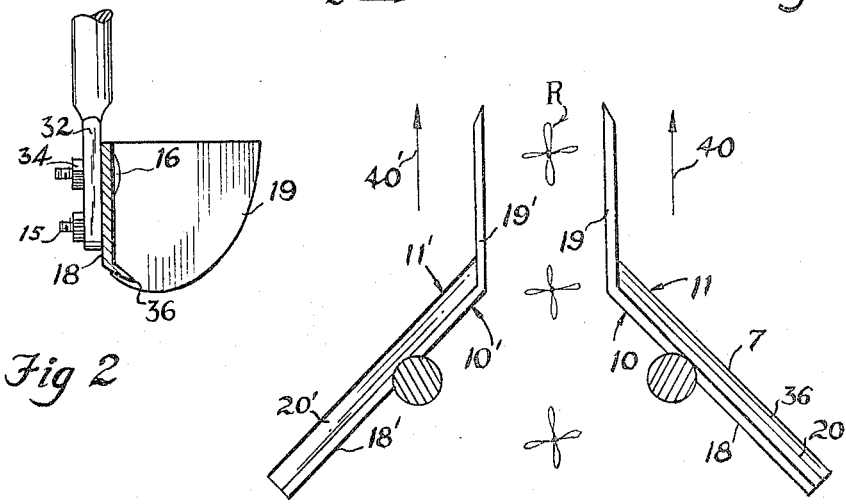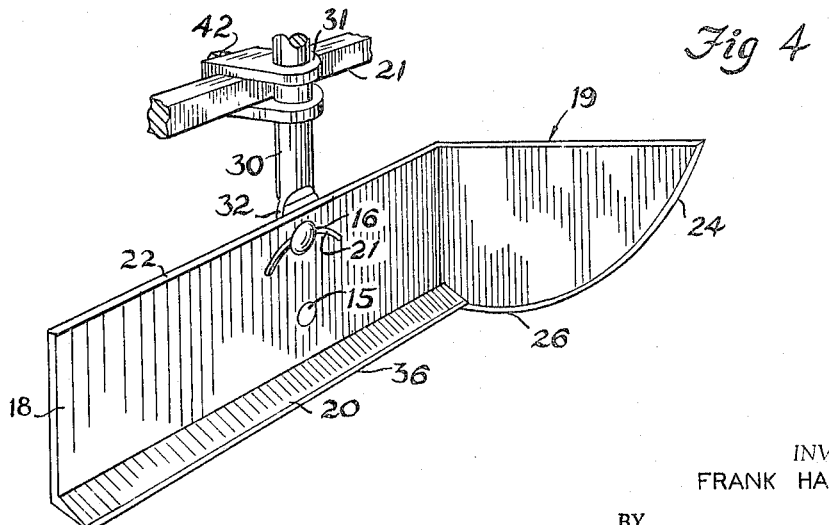

3,291,223
CULTIVATOR PLANT HOE
Frank Hammons, P.O. Box 83, Glen Allan, Miss.
Filed Apr. 1, 1964, Ser. No. 356,608
2 Claims. (Cl. 172—686)

This invention relates to earth working implements and more particularly, to a hoe for cultivating the soil adjacent to a crop row.

The cultivation of row crops frequently requires the working of the soil between crop rows in order to control the growth of weeds. In the working of this soil between crop rows, it is desirable that the soil be worked as close to the base of the plants in a crop row as possible since this provides maximum control of weeds. However, the soil must be worked without damage to the roots or foliage of the plants in a crop row.

Moreover, the cultivation of row crops frequently requires that soil be moved toward the plants in a crop row since this results in weeds between the plants in a crop row being covered by soil and controlled. In addition, it is frequently necessary to move soil away from the plants in a crop row so as to place less dirt at the bases of the plants. This is because the removal of soil from the bases of the plants in a crop row facilitates harvesting of some crops and aids the growth of others.

It is desirable that the working of soil between crop rows and the moving of soil toward or away from plants in a crop row be accomplished as simultaneous operations since this results in a significant reduction in the time required for cultivating a crop. However, previous hoes mounted on the tool bar of a cultivator or tractor have generally not been suited for performing both of these operations simultaneously. Thus, previous hoes have required that these operations be performed separately and successively.

Moreover, many previous hoes have been relatively or wholly unsuited for performing one or the other of these operations. For example, previous hoes adapted to working the soil between crop rows frequently cause damage to the plants in a crop row when they are used to move soil toward or away from the crop row. Similarly, previous hoes adapted to moving soil toward or away from crop rows frequently cause the soil between crop rows to be uneven and unsuited for further cultivating operations when they are used for working the soil between crop rows.

The hoe disclosed herein overcomes these and other difficulties and limitations encountered with previous hoes. The invention permits the simultaneous working of the soil between crop rows and moving the soil toward or away from a crop row. Moreover, the invention permits the soil between crop rows to be worked close to the plants in a crop row without damage to the roots or foliage of the plants. Thus, while moving dirt toward or away from the plants in a crop row, the invention permits substantially all the soil between adjacent crop rows to be worked. Moreover, the invention leaves the soil between and adjacent crop rows relatively level and smooth so as to facilitate further cultivating operations. This level and smooth condition of the soil is ideally suited for the application of weed or grass inhibiting chemicals and of flame.

In addition, the hoe disclosed herein is readily adaptable to forming a trench adjacent to a crop row, to gently sloping the soil away from the plants in a crop row, and to variety of other cultivating operations. However, in spite of its versatility and adaptability to a variety of cultivating operations, the hoe disclosed herein is relatively simple and inexpensive to manufacture and extremely durable.

These improvements in hoes are provided by a hoe having a guide member which is vertically positioned parallel to the direction of motion of the hoe adjacent to a crop row and a blade member which extends from the rear edge of the guide member in a direction transverse and opposite to the direction of motion of the hoe. The guide member has a lower edge which cuts into soil along a line parallel to the direction of motion of the hoe adjacent to a crop row. The blade member is formed by a substantially vertical rectangular backplate and by a substantially horizontal blade extending from the guide member along the entire lower edge of the backplate.

When the guide member is moved along parallel to and adjacent a crop row with the blade member extending outwardly from the crop row, the horizontal blade of the blade member penetrates that soil lying outwardly of the guide member from the crop row and the backplate of the blade member moves the layer of soil sliced away by the horizontal blade outwardly. The guide member cleanly divides that soil worked by the blade member from that soil containing the roots of the plants in a crop row. In addition, as the guide member cuts into the soil along a line parallel to the direction of motion of the hoe it provides stability to the entire hoe.

The guide member also serves to prevent the foliage of the plants in a crop row from being damaged by the hoe and to prevent the blade member from throwing dirt on the plants in a crop row. Thus, it will be seen that the guide member and the blade member cooperate to work the soil between crop rows and to move the soil transversely to the direction of motion of the hoe as simultaneous operations while at the same time providing a hoe having good stability and which may be used close to the plants in a crop row without damaging the foliage of the plants and without dirt being thrown on the plants in the crop row.

These and other features and advantages of the present invention will be more clearly understood from the following detailed description and the accompanying drawings in which like characters of reference designate corresponding parts in all figures and in which:

FIG. 1 is a side elevational view of a hoe having the blade member and the guide member arranged so that the hoe moves soil away from a crop row when the guide member is moved along and adjacent the right side of the crop row.

FIG. 2 is a sectional view of the hoe shown in FIG. 1 taken in line 2—2 in FIG. 1.

FIG. 3 is a perspective view of the hoe shown in FIG. 1.

FIG. 4 is a top plan view showing on the right side of a crop row the hoe shown in FIG. 1 and on the left side of a crop row a hoe having the blade member and guide member arranged to move soil away from the crop row as the guide member moves along and adjacent the left side of the crop row.

These figures and the following detailed description disclose a specific embodiment of the invention but the invention is not limited to the details disclosed since it may be embodied in other equivalent forms.

The hoe 10 disclosed herein is best understood as comprising a blade member 11 formed by a backplate 18 and a blade 20, a guide member 19 extending at an angle to the blade member 11 from one end of the blade member 11, and a support member 30 extending between the blade member 11 and the tool bar 21 of a cultivator, tractor, or other similar known means (not shown) for moving the hoe with respect to a crop row. The backplate 18 of the blade member 11 is an elongated rectangular plate and the guide member 19 is a substantially flat plate integral with the backplate 18 of the blade member 11 along a short edge of the backplate 18.

This arrangement results in the backplate 18 of the blade member 11 and the guide member 19 being both substantially perpendicular to the same plane of reference. Furthermore, in the specific embodiment of the invention described herein, the upper edge 22 of the backplate 18 and the upper edge 23 of the guide member 19 are both in a plane of reference substantially perpendicular to the backplate 18 and guide member 19.

The guide member 19 forms an obtuse angle with the backplate 18 of the blade member 11 and in the specific embodiment of the invention described herein, the angle formed between the guide member 19 and the backplate 18 of the blade member 11 is approximately one-hundred and thirty-five degrees. However, it will be apparent when the operation of the hoe 10 is understood that the blade member 19 and the backplate 18 may form other obtuse angles with each other and that the width of a strip of soil between crop rows worked by the hoe 10 may be varied by simply selecting a different obtuse angle.

The blade member 19 has an arcuate lower edge 24 extending in a curving manner from its upper edge 23 to its rear edge 25 at which it joins the backplate 18. The arcuate lower edge 24 of the blade member 19 is sharpened to form a cutting edge which cuts through the soil when the hoe is moved with the blade member 19 vertically positioned parallel to the direction of motion of the hoe 10.

The blade 20 of the blade member 11 is integral at one end with the guide member 19 adjacent the arcuate lower edge 24 of the guide member 19 and extends along the entire length of the lower edge of the backplate 18. As is best shown in FIG. 2, the blade 20 and the backplate 18 of the blade member 11 form an obtuse angle with each other and as a result, the blade 20 extends from the backplate 18 in the same general direction as the guide member 19.

It will now be understood that when the hoe 10 is positioned with the guide member 19 in a substantially vertical plane parallel to a crop row and with the bottom segment 26 of the arcuate lower edge 24 of the guide member 19 cutting into the soil, the backplate 18 of the blade member 11 is in a substantially vertical plane and extending from the guide member 19 at an angle to the crop row. In addition, the outer edge 36 of the blade 20 is cutting into the soil along the entire length of the blade member 11.

The outer edge 36 of the blade 20 is sharpened to facilitate cutting into the soil with the blade 20 and it will also be understood that when the hoe 10 in the above position is moved along a line of motion 40 parallel to the crop row, the guide member 19 cuts into the soil along a line parallel to the crop row and the blade 20 cuts a layer of soil which is as wide as that component of the length of the blade 20 perpendicular to the plane of the guide member 19. As the hoe 10 moves, the layer cut from the soil by the blade 20 moves over the blade 20 and strikes the backplate 18 of the blade member 11 which in turn pushes the layer of soil along its backwardly inclined surface until the soil is discharged from the hoe 10 at that end of the backplate 18 most remote from the guide member 19.

As a layer of soil is cut from the soil between crop rows by the blade 20 and moves along the backplate 18, the soil of the layer is broken into small pieces and clumps by the backplate 18. Thus, when the soil is discharged from that end of the blade member 11 most remote from the guide member 19, the soil in small pieces and clumps so as to expose the roots of weeds in the layer of soil cut by the blade 20. The result is that substantially all of these weeds are destroyed and it will now be understood that when the hoe 10 is moved between adjacent crop rows, the blade member 11 serves to cut a layer containing weeds from the soil and to deliver the soil in the layer with the roots of weeds exposed to that end of the blade member 11 most remote from the guide member 19. Moreover, even if the weeds in the layer of soil cut by the blade 20 and moved outwardly by the backplate 18 are not completely destroyed and continue to grow, they interfere little with the growth of the crop when positioned outwardly of the crop row by the hoe 10 since a relatively wide clean area is left adjacent the crop row for the row crop to attain the water and minerals necessary for crop growth.

The arcuate lower edge 24 of the guide member 19 cuts into the soil ahead of the blade 20 of the blade member 11 and when the guide member 19 is cutting into the soil along a line parallel to the direction of motion 40 of the hoe 10 it serves to sharply divide the soil worked from that not worked. Moreover, the soil on both sides of the guide member 19 tends to hold the guide member 19 in a plane parallel to the direction of motion 40 of the hoe 10. Thus, the guide member 19 adds stability to the hoe 10 by resisting the tendency of the hoe 10 to twist into a position in which the blade member 11 is parallel to the direction of motion 40 of the hoe 10.

Whether the soil is moved toward or away from a crop row as the hoe 10 is moved parallel to the crop row depends upon whether the hoe is positioned with the guide member 19 adjacent to the crop row and the blade member 11 extending away from the crop row or is positioned with the guide member 19 remote from the crop row and the blade member 11 extending toward the crop row. When the hoe 10 is positioned with the guide member 19 adjacent to the crop row, the guide member 19 prevents soil from leaving the blade member 11 adjacent to the crop row and serves to prevent soil from being thrown on the plants in the crop row. In this position the guide member 19 also serves to press the foliage of plants in the crop row inwardly and permits the soil to be worked close to the crop row without damage by the hoe 10 to the roots or foliage of the plants in the crop row.

When the hoe 10 is positioned with the guide member 19 remote from the crop row, the discharge of soil from that end of the blade member 11 opposite the guide member 19 serves to efficiently place soil in the crop row between the plants of the crop row. Thus, the hoe 10 disclosed herein is ideally suited for working the soil between crop rows while simultaneously moving soil from or toward a crop row.

It is by the support member 30 that the hoe 10 is attached to the tool bar 21 of a cultivator or tractor so that the hoe 10 either moves soil toward or away from a crop row while at the same time working the soil between crop rows. The support member 30 is a cylindrical shaft flattened at one end into a rectangular support 32 and which extends vertically and downwardly from a clamp 31 fixedly attached to the tool bar 21. The rectangular support 32 is positioned so that it is the lowermost end of the support member 30 and extends behind the backplate 18. A bolt 15 extends through the support member 30 and the backplate 18 so as to permit pivotable motion of the backplate 18 about the bolt 15. The hole (not shown) in the backplate 18 is countersunk and the head of the bolt 15 is flush with the surface of the backplate 18 so that the bolt 15 does not interfere with the motion of soil along the backplate 18.

A bolt 16 is inserted through the support member 30 and an arcuate slot 21 in the backplate 18. The arcuate slot 21 is above the hole (not shown) through which the bolt 15 is inserted and has a center of curvature corresponding with the centerline of the bolt 15. The arcuate slot 21 permits the blade member 11 to pivot about the bolt 15 into a plurality of positions with respect to the support member 30 between extreme positions at which the bolt 16 strikes the ends of the arcuate slot 21. A nut 34 threadably engages one end of the bolt 16 and wedges the backplate 18 against the rectangular support 32. The result is that the backplate 18 of the blade member 11 is fixedly positionable at each of the plurality of positions into which it rotates.

It will now be understood that the backplate 18 of the hoe 10 can be fixedly positioned with respect to the rectangular support 32 so that the upper edge 22 of the backplate 18 is substantially perpendicular to the centerline of the support member 30. This places the upper edge 22 of the backplate 18 substantially horizontal and when the upper end of the support member 30 is positioned within the bracket 31 so that the guide member 19 is parallel to the direction of motion 40 of the hoe 10, the hoe 10 will operate in the manner described above.

However, it will also be understood that the backplate 18 may be rotated with respect to the rectangular support 32 so that the blade 20 is at an angle with respect to a horizontal plane. When the backplate 18 is rotated with respect to the rectangular support 32 so that the blade 20 extends downwardly toward the crop row, the blade 20 will cut deeper into the soil at that end of the hoe 10 adjacent to the crop row. Thus, if the guide member 19 is adjacent to the crop row, the hoe 10 will serve to cut a trench adjacent to the crop row.

Similarly, if the backplate 18 is rotated with respect to the rectangular support 32 so that the blade 20 extends downwardly away from the crop row, movement of the hoe 10 adjacent to a crop row causes the hoe 10 to gently slope the soil away from the crop row. Since the rotating of the backplate 18 to incline the blade 20 to a horizontal plane tends to move the guide member 19 out of a plane parallel to the direction of motion 40 of the hoe 10, the support member 30 is rotatable about its vertical axis to the extent necessary to maintain the guide member 19 in a plane parallel to the direction of motion 40 of the hoe 10 as the blade member 11 pivots about the bolt 15. This is provided by locking the support member 30 in the clamp 31 with a bolt 42 which forces the clamp 31 away from the tool bar 21 so as to fixedly position both the clamp 31 and support member 30 in known manner. Loosening of the bolt 42 permits rotation of the support member 30 and quick and easy adjustment of the position of the guide member 19.

OPERATION

It will be apparent from the foregoing description of the hoe 10, that the hoe 10 is most conveniently used when paired with another hoe 10'. The hoe 10' is the mirror image of the hoe 10, and when placed on the opposite side of a crop row R from the hoe 10, the hoe 10' works and moves the soil in an identical manner to the hoe 10. Use of a pair of hoes 10 and 10' is best shown in FIG. 4 and it will be seen that when the guide members 19 and 19' of the hoes 10 and 10' are moved parallel and adjacent to a crop row R with the blades 20 and 20' substantially horizontal, the blade members 11 and 11' serve to work the soil on both sides of the crop row R and to move the soil outwardly from both sides of the crop row R. It will be understood that if the positions of the hoes 10 and 10' with respect to the crop row R are reversed, the hoes 10 and 10' will work the soil on both sides of the crop row and will moves the soil inwardly toward the crop row R from both sides of the crop row R.

From what has been said above, it will be also understood that the backplates 18 and 18' can be adjustably positioned with respect to the support members 30 and 30' so that the hoes 10 and 10' form a trench on both sides of the crop row R, gently slope the soil away from the crop row R on both sides, or accomplish a variety of other operations. Thus, the hoe 10 disclosed herein, whether used alone or in pairs, provides a highly versatile farming implement which permits the simultaneous working of soil between crop rows and moving of soil toward or away from a crop row. Used alone or in pairs, the hoe 10 also permits a trench to be formed adjacent to a crop row, the soil to be gently sloped away from a crop row, and a variety of other farming operations. The hoe 10 is easily adjusted to each of these farming operations and is sturdy and durable in construction and relatively inexpensive to manufacture.

It will be obvious to those skilled in the art that many variations may be made in the embodiments chosen for the purpose of illustrating the present invention without departing from the scope thereof as defined by the appended claims.

What is claimed as invention is:

1. A cultivator hoe including, a guide member adapted to be disposed in a vertical plane substantially parallel to the normal direction of travel of the hoe and spaced laterally from a crop row while in operation, said guide member comprising a straight upper horizontal edge and defining an arcuate leading front cutting edge extending from said upper horizontal edge to a rear vertical edge of said member, a single generally rectangular backplate formed integrally with said guide member extending in a vertical plane from the vertical plane rearwardly of the rear vertical edge of said guide member at an obtuse angle with respect to the plane of said guide member, and an integral elongate blade inclined downwardly at an obtuse angle from the lower edge of said backplate and outwardly within the obtuse angle formed between said back plate and said guide member and engaging the vertical face of said guide member at the end of the cutting edge of the guide member adjacent the rear vertical edge of the guide member.

2. A cultivator comprising, pair of transversely spaced hoes, each hoe including, a guide member adapted to be disposed in a vertical plane substantially parallel to the normal direction of travel of the hoe and spaced laterally on opposite sides of a crop row while in operation and parallel to the guide member of other hoe of the pair, said guide member comprising a straight horizontal upper edge and defining an arcuate leading front cutting edge extending from said upper horizontal edge to a rear vertical edge of the guide member, the arc of said cutting edge extending below the juncture of said cutting edge with said vertical rear edge, a single generally rectangular, longitudinally elongate back plate formed integrally with said guide member and extending in a vertical plane from the vertical plane of the rear vertical edge of said guide member at an obtuse angle from the face of said guide member, and an elongate flat blade formed integrally with said back plate and guide member and extending from the lower edge of said backplate at a downwardly inclined obtuse angle and outwardly within the obtuse angle formed between said back plate and said guide member, and engaging the vertical face of said guide member at the end of the cutting edge of the guide member adjacent the rear vertical edge of the guide member, means for mounting said hoes in opposed parallel relation and means for independently varying the longitudinal angularity of each hoe.

References Cited by the Examiner

UNITED STATES PATENTS

| | | | |
|---|---|---|---|
| 397,133 | 2/1889 | Lyon | 172—73 |
| 401,178 | 4/1889 | Kirkbride | 172—725 X |
| 1,178,523 | 4/1916 | Latham et al. | 172—725 X |
| 1,847,490 | 3/1932 | Mayfield | 172—190 X |
| 2,876,852 | 3/1959 | Kenney | 172—642 X |
| 2,926,733 | 3/1960 | Pereira | 172—190 X |
| 3,082,829 | 3/1963 | Buddingh et al. | 172—543 X |

ABRAHAM G. STONE, *Primary Examiner.*

T. GRAHAM CRAVER, ANTONIO F. GUIDA,
*Examiners.*

J. R. OAKS, *Assistant Examiner.*